April 12, 1927.  W. SCHWEMLEIN  1,624,767

BOLT

Filed Dec. 29, 1924

Inventor

WILLIAM SCHWEMLEIN

Attorney

Patented Apr. 12, 1927.

1,624,767

UNITED STATES PATENT OFFICE.

WILLIAM SCHWEMLEIN, OF PARKERSBURG, WEST VIRGINIA, ASSIGNOR TO THE PARKERSBURG RIG & REEL COMPANY, OF PARKERSBURG, WEST VIRGINIA, A CORPORATION OF WEST VIRGINIA.

BOLT.

Application filed December 29, 1924. Serial No. 758,763.

This invention relates to bolts, and more particularly to lock bolts.

While the bolt forming the subject matter of the present invention is particularly adapted for use in derrick constructions, it may be employed for any use wherein a machine bolt is now employed, and locked in position.

Specifically, the present invention consists in the provision of a lug arranged on the under side of the head of the bolt of substantially the same width as the bolt diameter and extending to the outer edge of the bolt head. Heretofore, it has been customary to employ lock washers in connection with bolts on derricks. While a lock washer will prevent the nut from turning with respect to the derrick member, it does not provide means for retaining the bolt in its desired position. By employing the bolt forming the subject matter of this invention, the lug may be arranged in a slot in the derrick girt or brace to prevent it from turning and the nut tightened with a single wrench.

I am aware that in the type of bolt known as a track bolt, it has been proposed to provide a projection or lug to be received in a slot or recess to prevent the bolt from turning, but it the ordinary construction of track bolt, the line of pull between the nut and the bolt is some distance beyond the point that would be fixed by an ordinary machine bolt and it is not particularly adapted for use in derrick fittings.

In the accompanying drawings, I have shown one embodiment of the invention: In this showing:

Figure 1:
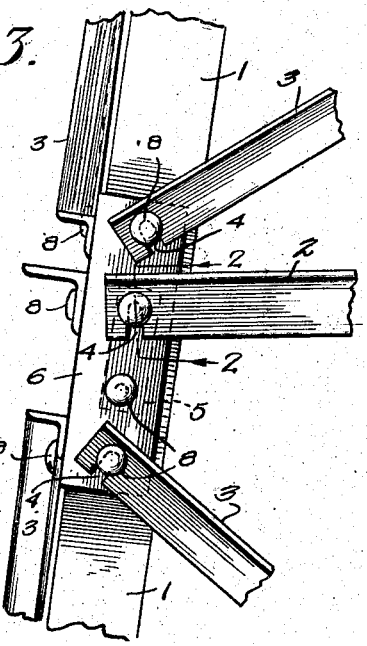
Figure 1 is an enlarged front elevation of a derrick fitting.

Referring to the drawings, the reference numeral 1 designates generally portions of the sides of a derrick. The sides are formed of a plurality of sections known as leg sections and these sections are connected to each other by suitable fastening means. Reference numeral 2 designates horizontal braces and 3 designates diagonal girts. The ends of these members are provided with slots 4. Where the leg sections are connected to each other, it is customary to provide a splice plate 5 on one side and a splice angle 6 on the opposite side.

Figure 3:
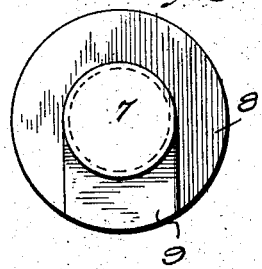
Figure 3 is an end elevation of the bolt forming the subject matter of the present invention.
Figure 4:
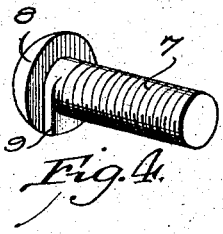
Figure 4 is a perspective view thereof.
Figure 2:
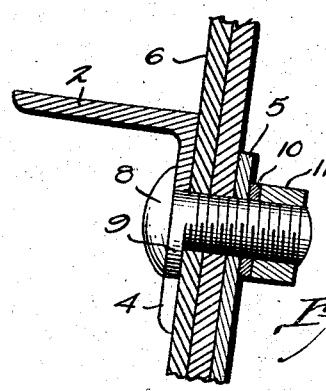
Figure 2 is a detail sectional view through a derrick fitting on line 2—2 of Figure 1.

The bolt forming the subject matter of the present invention consists of a threaded portion 7 and a head 8. Adjacent the under side of the head, there is provided a lug or projection 9 which is of substantially the same width as the diameter of the bolt (see Figure 3). When the bolt is assembled, as shown in Figure 2 of the drawings, this lug is arranged in the slot 4 and prevents the bolt from turning. A lock washer 10 is placed on the opposite end of the bolt and a nut 11 then tightened on the bolt.

It will be apparent that the provision of the lug 9 permits a nut to be securely tightened with the use of only a single wrench. In the ordinary type of bolt, which is free to turn, it is necessary to hold the head of the bolt with one wrench and tighten the nut with a second wrench, which is often very difficult to do in view of the position of the various parts of the derrick and the inaccessibility of the bolt head.

It is to be understood that the form of my invention herewith shown and described is to be taken as a preferred example of the same, and that various changes in the shape, size, and arrangement of parts may be resorted to without departing from the spirit of the invention or the scope of the subjoined claim.

I claim:

A bolt comprising a threaded portion, a head formed on one end of said threaded portion, and a projection extending from one side only of said threaded portion adjacent the under side of said head, said projection being of a width equal to the diameter of the threaded portion of said bolt, and the sides of said projection being parallel to each other.

In testimony whereof, I affix my signature.

WILLIAM SCHWEMLEIN.